(No Model.)

O. N. FERRY.
PREPARING CHEESE COMPOUNDS.

No. 507,897. Patented Oct. 31, 1893.

ATTEST
H.B. Moser
A.J. Symes Jr.

INVENTOR.
Orlando N. Ferry.
By H. J. Fisher
ATTORNEY.

UNITED STATES PATENT OFFICE.

ORLANDO N. FERRY, OF CLEVELAND, OHIO.

PREPARING CHEESE COMPOUNDS.

SPECIFICATION forming part of Letters Patent No. 507,897, dated October 31, 1893.

Application filed October 15, 1892. Serial No. 448,929. (No specimens.)

*To all whom it may concern:*

Be it known that I, ORLANDO N. FERRY, a citizen of the United States, residing at Cleveland, in the county of Cuyahoga and State of Ohio, have invented a certain new and useful Process of Converting Dairy Cheese; and I do hereby declare that the following is a full, clear, and exact description of the invention, which will enable others skilled in the art to which it appertains to make and use the same.

The object of my invention is to provide a method or process of treating the common every-day cheese as it is found in grocery stores for sale, and generally known as dairy cheese, so that its character is completely changed and an entirely new article of manufacture and commerce is produced.

In carrying out this new and useful process or method, I take a good article of cheese of the kind described, or, for that matter, any other cheese that will endure the process, as, for example, English dairy cheese, which usually is much firmer than American dairy, and totally disintegrate, break up or convert the same by squeezing or forcing it through small holes or perforations in any device, instrument, or machine which is constructed suitably for this purpose. Preferably I employ a machine of the kind shown in the accompanying drawings, in which—

Figure 1:
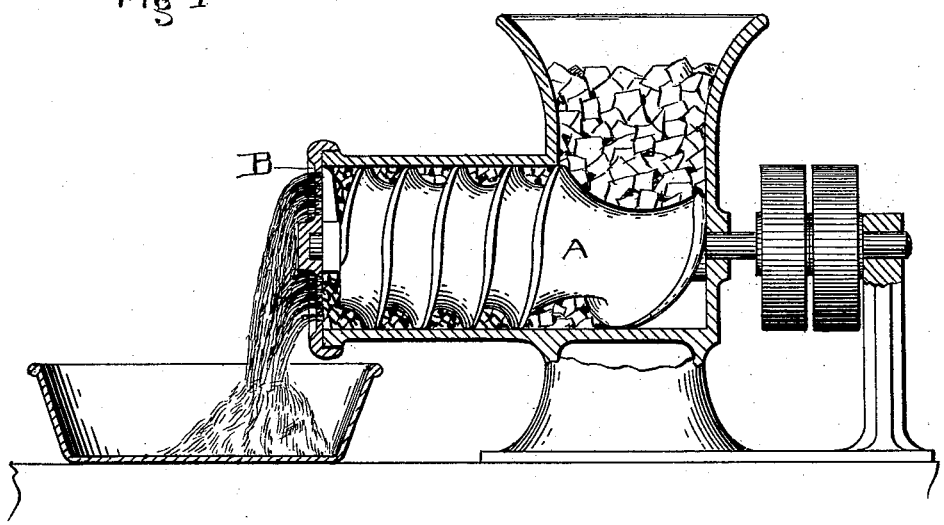
Figure 2:
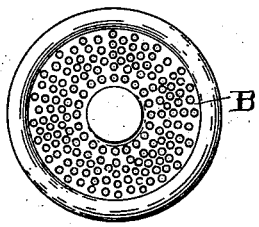

Figure 1, represents a longitudinal central section of a well-known kind of meat chopping or mincing machine, and Fig. 2 is a plan view of the perforated head through which the material is forced.

If a machine of this kind is used the cheese is simply cut into lumps small enough to feed into the machine, and then the worm A operates to carry the cheese forward and force it through the finely perforated plate B, in manner substantially as meat is forced through said plate. Indeed the change in character and quality which cheese undergoes in this process bears a striking resemblance to the change in meat similarly treated. Both originally are in a compact state, and in a sense solid, but in the change the cheese is converted into a wholly different form, and a form which, for the time being, is primitive, and from which the cheese must be changed or re-converted before it can again be regarded as an article of commerce and sale. But in this development to a merchantable article, a greatly improved article of manufacture is produced. Thus in carrying out my process, after the cheese has been reduced and converted as hereinbefore described, I add thereto anything that may be desirable to season the same to taste or to make it keep. Hence I usually add more or less salt, and a small quantity of suitable spirits, such as cologne spirits, brandy, or other anti-septic. After the application of seasoning, and, in some instances, of flavoring extracts, as preferred, I subject the material to a very thorough kneading, usually by hand, very much as dough is kneaded for baking, which incorporates the added ingredients and prepares the cheese for packing. When this has been well done the cheese appears more or less pasty like dough, though much more inclined to particles or granulation, and it is then ready to be packed in suitable vessels for the market. This last step in the process of preparing the article for market is important, because the packing should be so done as to exclude the air and make the cheese solid as possible. I have found it desirable to present this article to the trade in comparatively small vessels, and am now using half-pint jars as the most suitable for this purpose. These jars or pots are provided with covers and are hermetically sealed, and the packing in these jars is so performed as to practically exclude the air from the body of the cheese. Hence when the cheese is thus packed it is practically solid in the jar, like a jar of solid butter. Obviously larger jars may be used if preferred, but for family use, where a single jar is liable to last for several days, a small jar is deemed altogether best. Otherwise the cheese may become rancid, especially on the surface.

In the conversion of the cheese from its original condition to the form produced by this process, the change in the character and quality of the cheese is so very decided that practically no trace of the original remains. This change is due largely to the treatment it receives, as well as to the ingredients added. These ingredients may be largely varied in kind and quality and may be suited to the taste or fancy of customers.

When the cheese is ready for packing in the jars it is also ready for use, but commercial handling thereof and preserving the same from exposure to the atmosphere render packing in hermetically sealed vessels absolutely necessary. Otherwise it could not be placed in the market or exposed for sale.

While I have shown certain means whereby the first step in the process is carried out, I do not wish to have it considered that no other machine or device can be used for this purpose. Any means that will disintegrate or break up and convert the cheese from one form to another substantially as this machine does, may be used without departing from the spirit of the invention. If the same effect were obtainable by chopping the cheese it would be within the invention, the special or particular means of disintegrating the same not being of the essence of the invention.

By the use of the words "dairy cheese" in the claim, I mean the cheese ordinarily found in the markets and which is sold and known as dairy cheese, whether made in this country or foreign countries, and comprises the English dairy, the Swiss, Italian, and other pressed cheeses.

The radical change which the cheese undergoes by this process may be inferred by observing that it becomes a popular household article to be served and used on the table very much as butter is used, and can be spread on bread and crackers to make sandwiches.

Having thus described my invention, what I claim as new, and desire to secure by Letters Patent, is—

The process herein described of converting common dairy cheese into a new article of manufacture, which consists, first, in forcing the cheese through small perforations or holes to reduce it to a finely divided form; then adding seasoning and a preservative thereto, and then thoroughly kneading the cheese until it comes to a pasty condition and excluding the air therefrom, substantially as set forth.

Witness my hand to the foregoing specification this 30th day of September, 1892.

ORLANDO N. FERRY.

Witnesses:
H. T. FISHER,
EVA C. LATHAM.